United States Patent [19]

Williamson

[11] 3,905,451

[45] Sept. 16, 1975

[54] PRESSURE OILING SYSTEM AND OILING VALVE ASSEMBLY

[76] Inventor: James Byron Williamson, P. O. Box 55, Alachua, Fla. 32615

[22] Filed: Nov. 29, 1973

[21] Appl. No.: 420,261

[52] U.S. Cl. ............... 184/7 D; 137/114; 184/6.26; 184/55 A
[51] Int. Cl.² ......................................... F16N 27/00
[58] Field of Search .......... 184/7 CR, 7 D, 7 E, 7 F, 184/7 R, 55 A, 29, 55 R, 6.26, 56 A, 6.8; 137/111, 114, 115

[56] References Cited
UNITED STATES PATENTS

| | | | |
|---|---|---|---|
| 2,245,601 | 6/1941 | Medsker | 184/55 A |
| 2,687,187 | 8/1954 | Lake | 184/55 A |
| 2,830,678 | 4/1958 | Wantenaar | 184/55 A |
| 3,031,032 | 4/1962 | Dinkelkamp | 184/7 E |
| 3,052,318 | 9/1962 | Thomas | 184/7 CR |
| 3,559,765 | 2/1971 | Smith | 184/7 E |

Primary Examiner—Richard C. Pinkham
Assistant Examiner—Marvin Siskind
Attorney, Agent, or Firm—George H. Baldwin; Arthur G. Yeager

[57] ABSTRACT

An oiling system for supplying oil under pressure in controlled metered amounts to machinery oiling points and including an oiling valve assembly for supplying oil from the system into a compressed air line for oiling compressed air operated equipment. The oiling valve includes a heavy inertial piston movable upon passage of air through the valve to open a check valve which controls oil supply into the compressed air stream.

6 Claims, 2 Drawing Figures

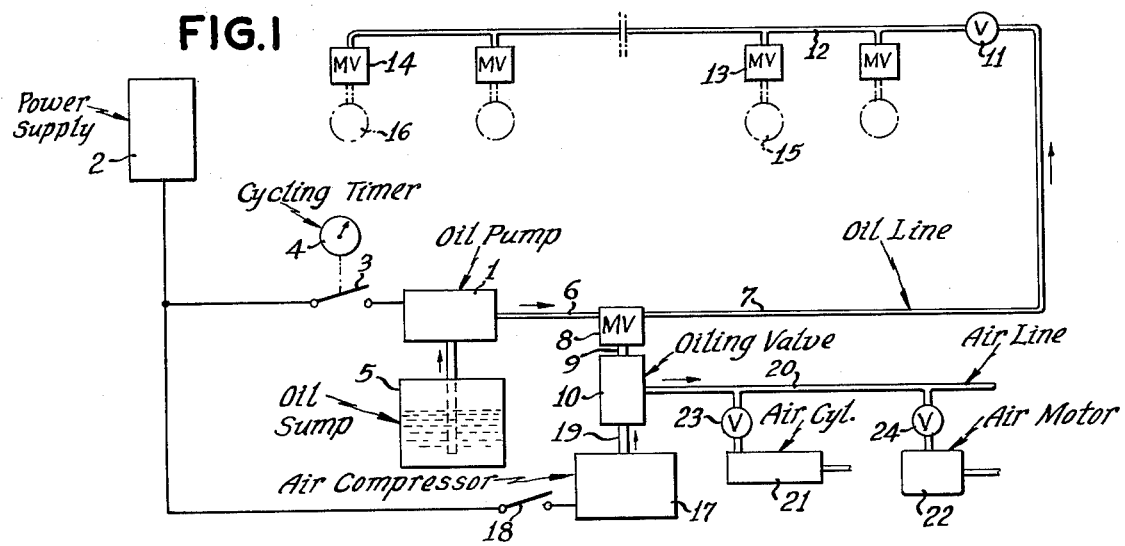
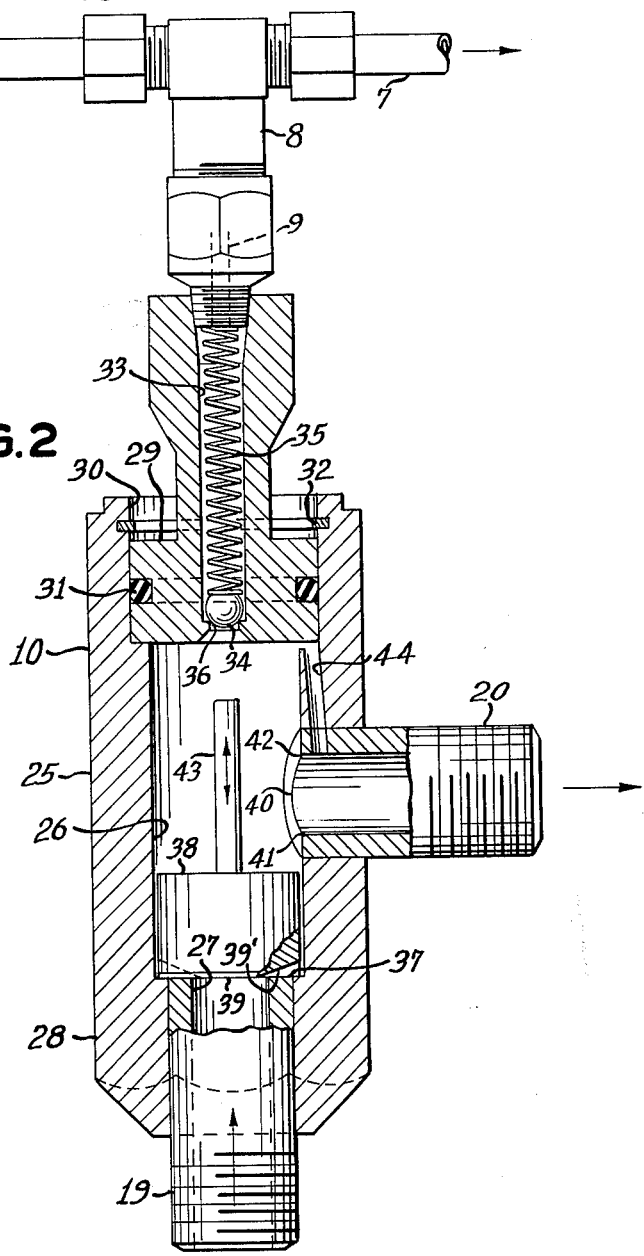

PRESSURE OILING SYSTEM AND OILING VALVE ASSEMBLY

BACKGROUND OF THE INVENTION

While various pressure lubricating systems for lubricating machinery bearings have been proposed, e.g. U.S. Pat. No. 3,145,803 — Cobert, and while it is known to provide lubrication to compressed air operated equipment by injecting oil into the compressed air line, e.g. U.S. Pat. Nos. 3,052,318 — Thomas and 2,887,181 — Dillon, such systems and injectors tend to be complex, expensive and unreliable.

It is an object of this invention to provide an improved oiling system and particularly an improved valve automatically responsive to flow of compressed air in a compressed air line for injecting lubricating oil thereinto.

In accord with the present invention, a cycling timer causes periodic or cyclic operating of a high pressure oil pump, and the oil is supplied through metering valves to various machinery bearings or the like and through a metering valve to an automatic oiling valve for mixing small quantities of lubricating oil in the form of a mist or small droplets into compressed air flowing to air-operated equipment.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a diagrammatic view of an oiling system embodying my invention; and

FIG. 2 is a detail view showing a fragment of the system of FIG. 1 and including a sectional view of an oiling valve according to the invention.

Turning now to the drawings, FIG. 1 shows an oiling system comprising an oil pump 1 periodically operated from a power supply 2 through a switch 3 cyclically opened and closed by a cycling timer 4. When operating, pump 1 delivers lubricating oil from a sump 5 under high pressure, such as about 900 p.s.i., into oil line 6. Line 6 continues as 7 past a T-connection feeding a branch metering valve 8 for supplying metered amounts of oil into branch oil conduit 9 connected to oiling valve 10.

Oil in line 7 is metered as high pressure occurs during each cycle through the metering valves exposed to such pressure. Line 7 is connected through a valve 11 into distribution line 12, and from this line through respective metering valves 13, 14 to supply oil to machinery parts requiring lubrication, represented in broken lines as bearings 15, 16. Valve 11 is opened, either manually or automatically, whenever the machinery with the parts 15, 16 or the like is in operation.

Each of the metering valves, including valves 8, 13, 14, may be of the type made and sold by the Alemite Division of Stewart-Warner Corporation, 1826 Diversey Pky., Chicago, Ill. identified as "Accumatic" Type 1 injectors No. 380105-T or No. 380101, or of the type shown in FIGS. 2 and 3 of the aforesaid U.S. Patent to Cobert — U.S. Pat. No. 3,145,803, and in a typical system, the cycle may be a one minute cycle with pump 1 in operation for 15 seconds, during which time the oil pressure increases to 800 or 900 p.s.i., and off for 45 seconds, during which the oil pressure may fall to about 50 p.s.i. As is well known, the pump 1 may include a check valve whereby pressure in line 6 builds up during pump operation and diminishes during the remainder of the cycle but without flowing back from the line into the pump.

An air compressor 17 is arranged to be powered from a suitable source, which may be source 2, under the control of a switch 18, which may be automatic or manual as is well known, and when in operation, the compressor provides compressed air, at, for example, 100 p.s.i. to an air line 19 connecting with the oiling valve 10, and through this valve and through a compressed air line 20 to air-operated equipment, including, for example, the air cylinder 21 and air motor 22 under the control of appropriate control valves 23 and 24, and other like equipment as desired.

Referring now to FIG. 2, in which the same reference numerals are applied to the elements heretofore described, and to which the above description is equally applicable, the oiling valve 10 is seen to comprise a hollow body 25 defining a cylindrical chamber 26 with an air inlet passageway 27 into the lower end portion 28 thereof and a closure plug 29 fitted in an enlarged counterbored upper end portion 30. The plug 29 is provided with a neoprene O-ring 31 sealing the plug in the counterbored portion 30, and a metal C-ring 32 is provided in the body above the plug for retaining the plug in the cylinder.

Plug 29 includes an elongated central passageway 33 constituting a continuation of oil conduit 9. A ball check valve member 34 is disposed in passageway 33 and biased by compression spring 35 toward cooperating valve seat 36 at the lower end of the passageway.

The inlet air passageway 27 is seen to be of less diameter than the internal diameter of chamber 26 thereby to provide a shoulder 37 outwardly around the passageway. This shoulder serves as a stop for a heavy, solid metal, inertial piston 38 having a loose fit in chamber 26. The piston has a lower end face 39 which, in the absence of air flow, rests on shoulder or stop 37. One or more relief notches 39' are formed to interrupt face 39 so that the piston when against stop 37 does not seal inlet air passageway 27, but should the pressure in chamber 26 tend to be greater than that in inlet conduit 19, such as when the air compressor is inoperative and the pressure therein is reduced, air may bleed from line 20 and from chamber 26 around the piston and into conduit 19.

A lateral air outlet port 40 is provided to pass air from chamber 26 into outlet conduit 20. This port is spaced above shoulder 37 and may be spaced approximately midway between the upper and lower ends of the chamber 26 as shown. The distance from the lower edge 41 of the port to the under surface of plug 29 should be greater than the height of piston 38, and, preferably, the distance from the upper edge 42 of the port to the under surface of the plug is greater than or, at least, nearly as great as such piston height, whereby the port may be completely, or in major part, uncovered by the piston in its uppermost position. More particularly, the area of the port which may be uncovered by the piston should be substantially equal to the cross-sectional area of the conduit 20 to minimize throttling of the air flow through the valve.

Fixed to piston 38 is an upstanding valve-actuating element in the form of post or pin 43 proportioned to enter through valve seat 36 into passageway 33 and arranged to lift valve member 34 from its seat. The piston is a heavy inertial piston, while the force of valve spring 35 is made small, serving only to bias ball 34 toward its seat and having no appreciable retardant effect when piston 38 is operating against the ball through pin 43. The diameter of the opening of valve seat 36 is a minor fraction of the diameter of cylindrical chamber 26 and of piston 38, and may typically be about one-quarter to one-sixth of such diameter. The diameters of the air inlet conduit 27 and of the outlet port 40 may be, typically, at least about one-half of the diameter of the cylindrical chamber 26 and at least two or three times the diameter of the opening of check valve seat 36.

A relief opening 44 is drilled through the body 25 providing communication between the upper end of chamber 26 below plug 29 into air outlet conduit 20. The function of this opening is to relieve any air pressure above the piston as it moves above port 40 which might build up from air trapped above the piston, exhausting any such trapped air into outlet line 20. The relief opening will further prevent the creation of a partial vacuum above the piston as it falls away from plug 29.

In operation, if there are several oiling cycles during which the air operated equipment 21, 22 is not being operated, i.e. with no air flow into line 20, the pressure above ball 34 will build up to 900 p.s.i. while piston 38 remains engaged with shoulder 37 and the air pressure in lines 19 and 20 equalizes at, say, 100 p.s.i. When the pressure in passageway 33 reaches 900 p.s.i., subsequent pressure surges in line 6, 7 cause no further oil to be metered through metering valve 8 into the passageway 33.

If, now, air valve 23 is opened to operate cylinder 21, the air pressure in line 20 is abruptly reduced, reducing the pressure above piston 38 causing the piston to accelerate rapidly upwardly to uncover port 40 and, through pin 43, to strike ball 34 a hammer-like blow and raise it from its seat. Thereafter, piston 38 remains in a raised position, at least partially exposing port 40 below the piston to accomodate the flow of air from conduit 19 into chamber 26 and thence through the port into air line 20.

The sharp blow delivered to the ball 34 is sufficient to raise the ball from its seat even against full 900 p.s.i. pressure in passageway 33, and the pressure in the passageway 33 is substantially immediately reduced so as to permit the position of the piston to be determined by the rate of flow of air from line 19 to line 20. As the air demand by the equipment 21, 22 increases, the pressure differential between lines 19 and 20 tends to increase and such increase tends to raise the piston 38 to further expose port 40.

The initial opening of valve 34, 36 provides a small spurt of oil into chamber 26, and this oil becomes entrained with the air flowing to the air-operated equipment. The mixing of the oil with the air may occur above piston 38 in the air flowing upwardly around the piston and through relief passage 44, or the oil may flow downwardly around the piston and be picked up as the air enters port 40 or be blown from the chamber walls or from the surfaces of the piston due to the turbulence, or, finally, if not otherwise picked up, the oil, if it collected on shoulder 37, would necessarily be entrained in the air entering into the chamber 26 through the air inlet opening 27.

Following the initial discharge of oil into the oiling valve chamber, an additional small quantity of oil is metered during each oil pressure cycle by valve 8 into passageway 33, and while air continues to be drawn, such as by apparatus 21, 22, such small quantities of oil pass into chamber 26 through open valve 34, 36.

When compressor 17 is shut down and its accumulator pressure is let off, pressure in line 20 is relieved around the loose fitting piston and through relief notch 39' into line 19.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An oiling valve for a compressed air line comprising an upright hollow cylinder having a lower end provided with an air inlet opening, an upper end provided with an oil inlet opening and a side wall having an air outlet port disposed spacedly between said upper and lower ends, a piston having a loose fit in said cylinder, means forming an oil pressure chamber opening into said cylinder through said oil inlet opening, a check valve comprising a movable valve member for closing the opening from said oil pressure chamber into said cylinder, and a pin engagable between said valve member and said piston upon lifting of said piston away from said lower end in response to compressed air flow from said air inlet opening to said outlet port.

2. An oiling valve in accord with claim 1 wherein said pin is of less length than the distance between said piston and valve member when said piston is at said lower end, and wherein said piston is a heavy inertial piston operative to deliver a hammer blow to said valve member upon such lifting thereof.

3. The combination according to claim 2 wherein said check valve includes a circular seat for said valve member and the diameters of said piston and cylinder are from about three to eight times as great as the diameter of said seat.

4. The combination according to claim 1 wherein said check valve includes a circular seat for said valve member and the diameters of said piston and cylinder are from about three to eight times as great as the diameter of said seat.

5. An oiling valve assembly comprising a metering valve adapted to be connected to a cyclically varying high pressure oiling system, a passageway connected to said metering valve for receiving metered quantities of oil therethrough from such system, said passageway having an open lower end comprising a check valve including a valve seat and a ball member engagable downwardly on said seat to close said check valve and raisable to open said check valve, an upright cylindrical air chamber below said check valve connected to said passageway through said check valve, said chamber having a lower end wall provided with a compressed air inlet opening adapted to be connected to a compressed air supply and a side wall provided with an air outlet port spacedly above said lower end wall adapted to be connected to air-operated apparatus, a heavy piston movably fitted in said chamber for falling freely to said lower end under the force of gravity in the absence of air flow through said chamber from said inlet opening to said port and raisable to uncover said port below said piston in response to such flow of air in response to demand of compressed air by such equipment, and a pin extending upwardly from said piston having an upper end spaced below said ball member when said piston is engaged with said lower end wall and liftingly engagable with said ball to open said check valve when said piston is so raised to uncover said port.

6. In a compressed air system including a source of lubricating oil under pressure, a source of compressed air and a line for supplying compressed air to air-operated equipment, an oiling valve assembly for injecting lubricating oil into such line for lubricating such equipment comprising an upright cylinder having upper and lower end walls and a side wall, a compressed air inlet opening in said lower end wall connected to said compressed air source, a check valve including a valve seat in said upper end wall and a valve member for closing downwardly against said seat, a connection to said oil source for supplying oil under pressure downwardly against said valve member urging said member into closed position, an air outlet port in said side wall spaced from said upper and lower walls connected to said line, a piston having a loose fit in said cylinder and having a lower end surface movable toward and away from said lower end wall, said lower end surface and said lower end wall being of nonconforming shape whereby said piston is inoperative to seal off said opening, a check valve actuating element in said cylinder between said piston and said valve member adapted and arranged to lift said valve member from its said seat upon substantial upward movement of said piston from said lower end wall but having a length insufficient to engage between said piston and said member until said piston is substantially elevated above said lower end wall, said piston being movable by the flow of air upwardly in said cylinder to at least partially expose said port below its said lower end surface and being sufficiently heavy when so moved to apply a hammer blow through said element to said valve member.

* * * * *